US010992097B2

(12) United States Patent
Puckett et al.

(10) Patent No.: US 10,992,097 B2
(45) Date of Patent: Apr. 27, 2021

(54) APPARATUS AND METHOD FOR AN OPTICAL RESONATOR WITH AN INTEGRATED BRAGG GRATING

(71) Applicant: Honeywell International Inc., Morris Plains, NJ (US)

(72) Inventors: Matthew Wade Puckett, Scottsdale, AZ (US); Karl D. Nelson, Plymouth, MN (US); Jianfeng Wu, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 236 days.

(21) Appl. No.: 15/618,833

(22) Filed: Jun. 9, 2017

(65) Prior Publication Data
US 2018/0358772 A1 Dec. 13, 2018

(51) Int. Cl.
H01S 3/067 (2006.01)
H01S 3/30 (2006.01)
G01C 19/66 (2006.01)
G01C 19/72 (2006.01)
H01S 3/10 (2006.01)
H01S 3/13 (2006.01)
H01S 3/00 (2006.01)

(52) U.S. Cl.
CPC .......... H01S 3/0675 (2013.01); G01C 19/661 (2013.01); G01C 19/721 (2013.01); G01C 19/727 (2013.01); H01S 3/0078 (2013.01); H01S 3/06791 (2013.01); H01S 3/10092 (2013.01); H01S 3/1303 (2013.01); H01S 3/1305 (2013.01); H01S 3/302 (2013.01)

(58) Field of Classification Search
CPC .......................... H01S 3/06791; H01S 3/0675
See application file for complete search history.

(56) References Cited

U.S. PATENT DOCUMENTS

| 3,958,188 | A | * | 5/1976 | Fletcher | ............ | G02B 6/02066 |
| | | | | | | 372/96 |
| 4,159,178 | A | | 6/1979 | Vali et al. | | |
| 4,396,290 | A | | 8/1983 | Morris | | |
| 4,863,272 | A | | 9/1989 | Coccoli | | |

(Continued)

FOREIGN PATENT DOCUMENTS

| EP | 2685213 A2 | 1/2014 |
| EP | 2927636 A1 | 10/2015 |

(Continued)

OTHER PUBLICATIONS

Campanella, C. E., F. De Leonardis, and V. M. N. Passaro. "Fiber Bragg grating ring resonators under rotation for angular velocity sensing." Applied optics 54.15 (2015): 4789-4796.*

(Continued)

Primary Examiner — Dominic J Bologna
Assistant Examiner — Rufus L Phillips
(74) Attorney, Agent, or Firm — Fogg & Powers LLC

(57) ABSTRACT

An apparatus is provided. The apparatus comprises: an optical resonator including a surface; wherein a Bragg grating is formed at least part of the surface of the optical resonator; and wherein the Bragg grating has a Bragg frequency substantially equal to a center frequency of an Nth order Brillouin gain region capable of generating an Nth order Stokes signal.

7 Claims, 9 Drawing Sheets

(56) References Cited

U.S. PATENT DOCUMENTS

| | | | |
|---|---|---|---|
| 4,922,481 A | 5/1990 | Hicks | |
| 4,952,059 A * | 8/1990 | Desurvire | G01C 19/64 356/461 |
| 5,064,288 A | 11/1991 | Dyes et al. | |
| 5,295,209 A * | 3/1994 | Huber | H04B 10/2537 372/26 |
| 5,323,404 A * | 6/1994 | Grubb | H01S 3/0675 359/334 |
| 5,323,415 A | 6/1994 | Quast et al. | |
| 5,351,252 A | 9/1994 | Toyama et al. | |
| 5,406,370 A | 4/1995 | Huang et al. | |
| 5,408,317 A | 4/1995 | Dyes et al. | |
| 5,440,669 A * | 8/1995 | Rakuljic | G02B 5/1857 359/1 |
| 5,517,305 A | 5/1996 | Raab | |
| 5,537,671 A | 7/1996 | Toyama et al. | |
| 5,912,910 A * | 6/1999 | Sanders | G02F 1/3534 359/326 |
| 6,407,855 B1 * | 6/2002 | MacCormack | H01S 3/0812 359/346 |
| 6,411,429 B1 * | 6/2002 | Tomofuji | H01S 3/067 359/337 |
| 6,424,664 B1 | 7/2002 | Oh et al. | |
| 6,560,246 B1 * | 5/2003 | Stepanov | G01R 15/246 372/6 |
| 7,024,069 B2 | 4/2006 | Savchenkov et al. | |
| 7,065,276 B2 | 6/2006 | Scheuer et al. | |
| 7,184,624 B1 | 2/2007 | Matsko et al. | |
| 7,272,160 B1 * | 9/2007 | Geng | H01S 3/302 372/29.011 |
| 7,372,574 B2 | 5/2008 | Sanders et al. | |
| 7,463,360 B2 | 12/2008 | Hughes et al. | |
| 8,289,616 B1 | 10/2012 | Maleki et al. | |
| 8,472,486 B1 * | 6/2013 | Henry | H01S 3/108 372/3 |
| 8,659,760 B2 | 2/2014 | Sanders et al. | |
| 8,718,112 B2 | 5/2014 | Mahrt et al. | |
| 8,830,478 B2 | 9/2014 | Wu et al. | |
| 9,537,283 B2 | 1/2017 | Strandjord et al. | |
| 9,581,448 B2 | 2/2017 | Christensen et al. | |
| 2001/0010593 A1 * | 8/2001 | Terahara | G02F 1/09 359/484.09 |
| 2004/0086004 A1 * | 5/2004 | Bonaccini | H01S 3/094015 372/6 |
| 2010/0322559 A1 * | 12/2010 | Ogawa | G02B 6/29394 385/37 |
| 2010/0329680 A1 * | 12/2010 | Presi | H04B 10/2587 398/79 |
| 2011/0122417 A1 | 5/2011 | Molin et al. | |
| 2011/0134940 A1 * | 6/2011 | Hartog | H01S 3/302 372/6 |
| 2011/0255094 A1 | 10/2011 | Mohageg et al. | |
| 2012/0189025 A1 | 7/2012 | Zheng et al. | |
| 2014/0152994 A1 | 6/2014 | Wu et al. | |
| 2014/0269789 A1 * | 9/2014 | Westbrook | H01S 3/0675 372/6 |
| 2014/0320863 A1 * | 10/2014 | Christensen | G01C 19/66 356/451 |
| 2016/0109736 A1 * | 4/2016 | Bahl | G02B 6/29341 385/1 |
| 2016/0204571 A1 * | 7/2016 | Wu | H01S 3/302 356/461 |
| 2017/0067743 A1 | 3/2017 | Salit et al. | |
| 2018/0081205 A1 * | 3/2018 | Puckett | G01C 19/722 |
| 2018/0081206 A1 * | 3/2018 | Puckett | G02B 6/122 |

FOREIGN PATENT DOCUMENTS

| | | |
|---|---|---|
| WO | 2010009951 | 1/2010 |
| WO | 2015191124 | 12/2015 |

OTHER PUBLICATIONS

European Patent Office, "Office Action from EP Application No. 13191290.9 dated Feb. 21, 2014", "from Foreign counterpart of U.S. Appl. No. 13/693,321", filed Feb. 21, 2014, pp. 1-6, Published in: EP.

European Patent Office, "Extended Search Report for EP Application No. 16187068.8 dated Jan. 23, 2017", "From Foreign Counterpart to U.S. Appl. No. 14/882,101", filed Jan. 23, 2017, pp. 18, Published in: EP.

United States Patent and Trademark Office, "Notice of Allowance", "From U.S. Appl. No. 14/882,101", filed Apr. 11, 2017, pp. 131, Published in: US.

Abd-Rahman et al., "Multiwavelength, bidirectional operation of twin-cavity Brillouin/erbium fiber laser", "Optics communications 181", Jul. 1, 2000, pp. 135-139, Publisher: Elsevier Science B.V.

Campanella et al., "Integrated Optics Bragg Grating Ring Resonators With Q-Factor on Gigascale", "arXiv:1307.2413 [physics.optics]", Jul. 2013, pp. 14.

Chen, Shiyi, "Stimulated Brillouin Scattering in an On-Chip Microdisk Resonator—Abstract", Dec. 2014, Publisher: University of Illinois at Urbana-Champaign.

Feng et al., "Tunable Microwave Generation Based on a Brillouin Fiber Ring Laser and Reflected Pump", "Optics & Laser Technology", Jan. 26, 2011, pp. 1355-1357, No. 43, Publisher: Elsevier.

Hitz, "Silicon Raman Laser Cascades Toward Mid-IR Spectral Region", "Nature Photonics", Mar. 2008, pp. 170-174.

Kim et al., "Non-reciprocal Brillouin Scattering Induced Transparency", "Nature Physics", Jan. 26, 2015, pp. 275-280, vol. 11.

Lecoeuche et al., "Bragg Grating Based Brillouin Fibre Laser", "Optics Communications 177 (2000)", Jan. 15, 2000, pp. 303-306, Publisher: Elsevier.

De Leonardis et al., "Performance of SOI Bragg Grating Ring Resonator for Nonlinear Sending Applications", "Sensors", 2014, pp. 16017-16034, vol. 14, Publisher: MDPI.

Li et al., "Microresonator Brillouin Gyroscope", "Optical Society of America", 2015, pp. 12, Publisher: https://www.osapublishing.org/abstract.cfm?URI=nlo-2015-NTh3A.2.

Matsko et al., "Optical resonators with whispering gallery modes I: Basics", "IEEE JSTQE", Jan.-Feb. 2006, pp. 3-14, vol. 12, No. 1.

Nicati et al., "Frequency Stability of a Brillouin Fiber Ring Laser", "Journal of Lightwave Technology", Jul. 1, 1995, pp. 1445-1451, vol. 13, No. 7, Published in: US.

Nicati et al., "Frequency Pulling in a Brillouin Fiber Ring Laser", "IEEE Photonics Technology Letters", Jul. 1994, pp. 801-803, vol. 6, No. 7, Publisher: IEEE.

Pant et al., "On-Chip Stimulated Brillouin Scattering", "Optics Express", Apr. 25, 2011, pp. 8285-8290, vol. 19, No. 9.

Pant et al., "On-chip Stimulated Brillouin Scattering for Microwave Signal Processing and Generation", "Laser & Photonics Reviews", 2014, pp. 653-666, vol. 8, No. 5.

Shen et al., "Microwave/Millimeter/Wave Generation Using Multi-Wavelength Photonic Crystal Fiber Brillouin Laser", "Progress in Electromagnetic Research", 2008, pp. 307-320, vol. 80, Publisher: PIER.

Slagmolen, "Phase-Sensitive Reflection Technique for Characterization of a Fabry-Perot Interferometer", "Applied Optics", Jul. 20, 2000, pp. 3638-3643, vol. 39, No. 21, Publisher: Optical Society of America.

Takesue et al., "An On-Chip Coupled Resonator Optical Waveguide Single-Photon Buffer", "Nature Communications", Nov. 12, 2013, pp. 1-11.

Wu et al., "Systems and Methods for an Optical Frequency Comb Stimulated Brillouin Scattering Gyroscope With Rigid Optical Waveguide Resonator", "U.S. Appl. No. 14/680,331, filed Apr. 7, 2015", Apr. 7, 2015.

Salit et al., "Single-Pump Cascaded Stimulated Beillouin Scattering (SBS) Ring Laser Gyro", "U.S. Appl. No. 14/882,101, filed Oct. 13, 2015", Oct. 13, 2015, pp. 137, Published in: US.

Salit et al., "Stimulated Brillouin Scattering (SBS) Gyro With Coupled Resonator for Frequency-Dependent Output Coupling", "U.S. Appl. No. 15/052,490, filed Feb. 24, 2016", Feb. 24, 2016, pp. 145, Published in: US.

(56) References Cited

OTHER PUBLICATIONS

Yariv, "Critical Coupling and Its Control in Optical Waveguide-Ring Resonator Systems", "IEEE Photonics Technology Letters, Apr. 2002", pp. 483-485, vol. 14, No. 4.
Zarinetchi et al., "Stimulated Brillouin fiber-optic laser gyroscope", "Optics Letters", Feb. 15, 1991, pp. 229-231, vol. 16, No. 4, Publisher: Optical Society of America, Published in: New York, NY.
Puckett et al, "Acoustic Ridge or Rib Waveguides in Low-Loss Integrated Optical Platforms", "U.S. Appl. No. 15/591,747, filed May 10, 2017", pp. 1-21, Published in: US.
Puckett, "Double-Layer High-Confinement Acousto-Optic Waveguide", "U.S. Appl. No. 15/379,165, filed Dec. 14, 2016", pp. 1-21, Published in: US.
Puckett, et al, "Etchless Acoustic Waveguiding in Integrated Acousto-Optic Waveguides", U.S. Appl. No. 15/591,836, filed May 10, 2017, pp. 1-20, Published in: US.
European Patent Office, "Extended Search Report for EP Application No. 18165567.1" Foreign Counterpart to U.S. Appl. No. 15/618,833, dated Dec. 7, 2018, pp. 1-8.
Shi et al., "Bias of a Resonator Fiber Optic Gyro Composed of a Polarization-Maintaining Fiber Ring Resonator With the Photoinducedbirefringent Grating", Journal of Lightwave Technology, vol. 13, No. 9, Sep. 1, 1995, pp. 1853-1857.

\* cited by examiner

APPARATUS AND METHOD FOR AN OPTICAL RESONATOR WITH AN INTEGRATED BRAGG GRATING

STATEMENT REGARDING FEDERALLY SPONSORED RESEARCH OR DEVELOPMENT

This invention was made with Government support under N66001-16-C-4017 awarded by SPAWAR Systems Center Pacific. The Government has certain rights in the invention. This material is based upon work supported by the Defense Advanced Research Projects Agency (DARPA) and Space and Naval Warfare Systems Center Pacific (SSC Pacific).

BACKGROUND

Optical resonators are widely used in optical systems, such as ring laser gyroscopes. Optical resonators are made, e.g. from optical fiber using silica and in integrated circuits using silicon nitride. When an optical pump signal of sufficiently high power is supplied to the resonator, non-linearities in the resonator material generate Stokes signals (or Stokes lines) at one or more frequencies. There can be a first order Stokes signal, a second order Stokes signal, etc. at progressively lower frequencies. Each Stokes signal gives rise to a next higher order Stokes signal as the power of the optical pump signal is progressively increased.

The Stokes signals may be altogether undesirable, e.g. because they diminish power, i.e. of the pump signal, or generate interference. However, because they have low phase noise, a sub-set of Stokes signal(s), e.g. the first order Stokes signal, may be desirable. Therefore, there is a need for suppressing Stokes signals of a particular order, and subsequent higher order Stokes signals.

SUMMARY

An apparatus is provided. The apparatus comprises: an optical resonator including a surface; wherein a Bragg grating is formed at least part of the surface of the optical resonator; and wherein the Bragg grating has a Bragg frequency substantially equal to a center frequency of an Nth order Brillouin gain region capable of generating an Nth order Stokes signal.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
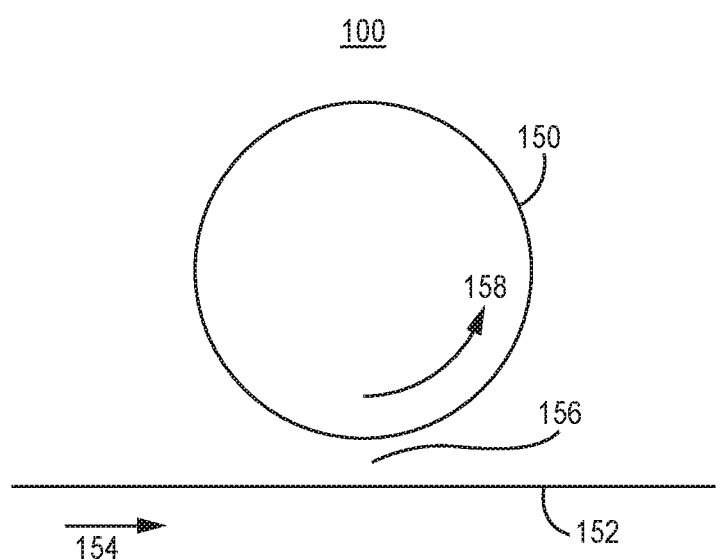
FIG. 1A illustrates a plan view of one embodiment of an optical ring resonator with an integrated Bragg grating, and a waveguide coupler.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

An optical resonator with an integrated Bragg grating may be used to overcome the above referenced problem. Embodiments of the optical resonator with an integrated Bragg grating have at least one advantage: generation of Stokes signals up to a specific order, and suppression of Stokes signals having orders higher than the specific order. In other embodiments, the power level of the one or more generated Stokes signals is greater than if the suppressed Stokes signals had not been suppressed. Further, although a ring resonator with an integrated Bragg grating is subsequently exemplified for pedagogical purposes, integrated Bragg gratings can be applied in a similar manner, e.g. to the exterior, of other optical resonators such as linear resonators and disc resonators. For a disc resonator, the Bragg gratings would be formed in circular side surface, of the disc resonator, which is typically perpendicular to the substrate on which the disc resonator is mounted. The Bragg gratings would be implemented in a manner similar to that described below.

FIG. 1A illustrates a plan view of one embodiment of an optical ring resonator with an integrated Bragg grating, and a waveguide coupler 100. A ring may be circular, triangular or any other closed perimeter geometry. In the illustrated embodiment, the optical ring resonator with the integrated Bragg grating 150 is proximate to an optical waveguide coupler 152. The Bragg grating is designed to have a center frequency, or Bragg frequency, substantially equal to the center frequency of an Nth order Brillouin gain region, or zone, capable of generating an Nth order Stokes signal.

An optical Bragg grating is a device with a periodic variation of the refractive index of the device so that a large reflectivity may be reached in some wavelength range around a certain wavelength which fulfills the Bragg condition:

$$T = \lambda_B / (2 \cdot n_e),$$

where $\lambda_B$ (the Bragg wavelength) is the vacuum wavelength of light, $n_e$ is the effective refractive index of the medium, and T is the grating period.

In one embodiment, an input optical signal 154 is injected into the optical waveguide coupler 152. The input optical signal 154 is coupled into the optical ring resonator with the integrated Bragg grating 150 at the narrowest portion 156 between the optical ring resonator with the integrated Bragg grating 150 and the optical waveguide 110. There, an evanescent field of a mode of the input optical signal 154 in the optical waveguide coupler 152 transitions to a mode supported by the optical ring resonator with the integrated Bragg grating 150, and generates a resonator optical signal 158 in the optical ring resonator with the integrated Bragg grating 150.

In one embodiment, the optical waveguide coupler 152 and the optical ring resonator with the integrated Bragg grating 150 are formed from optical fiber. In another embodiment, the optical waveguide coupler 152 and the optical ring resonator with the integrated Bragg grating 150 are formed from by waveguide on a substrate, e.g. using semiconductor manufacturing processes.

The Bragg grating acts as a notch rejection filter. In one embodiment, the Bragg grating is formed on the optical ring resonator with the integrated Bragg grating 150 by forming periodic notches on the exterior of the optical ring resonator with the integrated Bragg grating 150. For example, for optical waveguide having a circular periphery, such periodic notches would be around the whole exterior circumference of the optical fiber. Alternatively, for example for optical waveguide on a substrate, the notches would be made on parallel sides of the waveguide that are perpendicular to the substrate. In another embodiment, the notches in the optical ring resonator with the integrated Bragg grating 150 have a quadrilateral cross-section. However, notches having other geometric cross-sections, e.g. semi-circular and triangular, may be used. Further the notches may be on the surface of the whole or part of the optical ring resonator with the integrated Bragg grating 150.

Figure 1B:
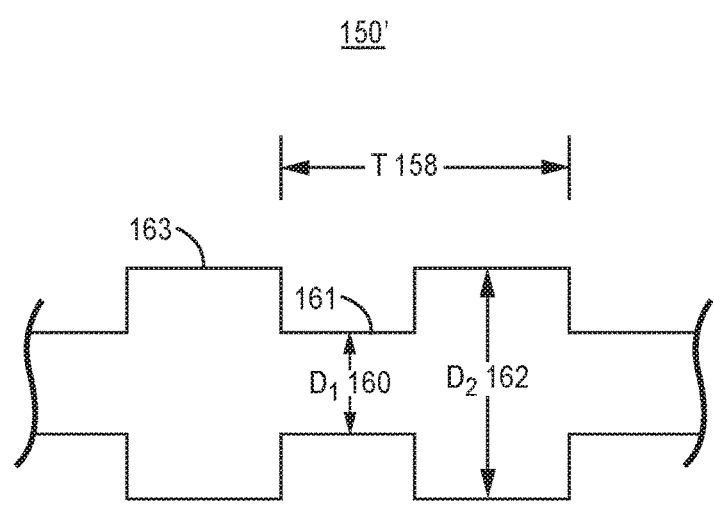
FIG. 1B illustrates a plan view of notches in a portion of a surface of an optical ring resonator with an integrated Bragg grating.

FIG. 1B illustrates a plan view of notches in a portion of a surface of an optical ring resonator with the integrated Bragg grating 150'. The illustrated notches 161 in the surface 163 have a quadrilateral cross-section. T 158 is the grating period. Thus, the Bragg wavelength, or location of the center wavelength of the rejection notch filter, is:

$$\lambda_B = 2n_e \cdot T,$$

where $n_e$ is the effective refractive index of the grating in the waveguide. The depth of a notch, $D_1$ 160, with respect to the width or diameter of the waveguide, $D_2$ 162, can vary. In one embodiment, $D_1=6$ μm and $D_2=8$ μm, or $D_1/D_2=0.75$; however, the ratio can be higher or lower than 0.97, e.g. such that the notch is shallower or deeper, respectively. The greater the ratio, D1/D2, the higher the Q factor of the rejection notch filter.

Figure 1C:
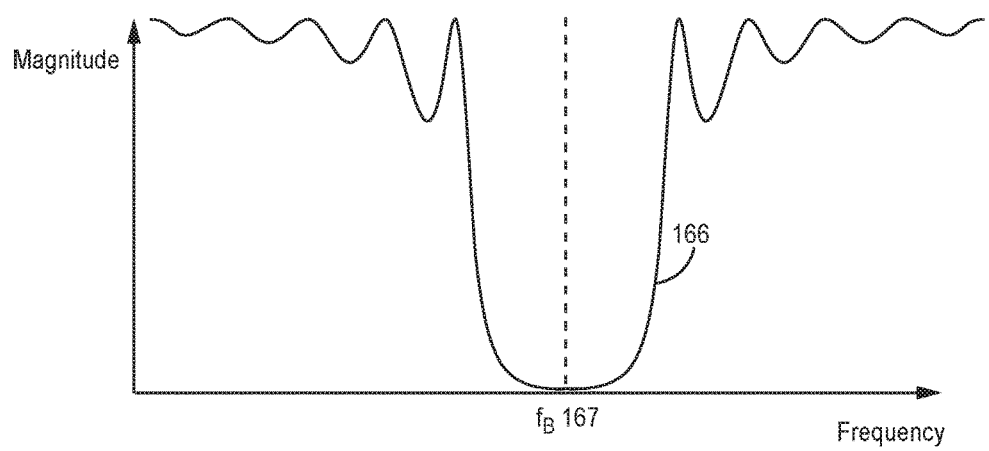
FIG. 1C illustrates one embodiment of an exemplary transmission response of a Bragg grating.

FIG. 1C illustrates one embodiment of an exemplary transmission response of a Bragg grating 164. The illustrated transmission response has a band rejection notch 166. The center frequency or Bragg frequency of the notch ($f_B$) 167, where $f_B = v/\lambda_B$, and v is the phase speed the material forming the optical waveguide used to make the optical ring resonator. The band rejection notch 166 arises due to signals, reflected by the Bragg grating 164, being in phase and adding constructively, generating a back reflected signal centered about the Bragg wavelength (or frequency). Reflected signals at other wavelengths do not add constructively and are cancelled out, and such wavelengths are transmitted through the Bragg grating 164.

Figure 2A:
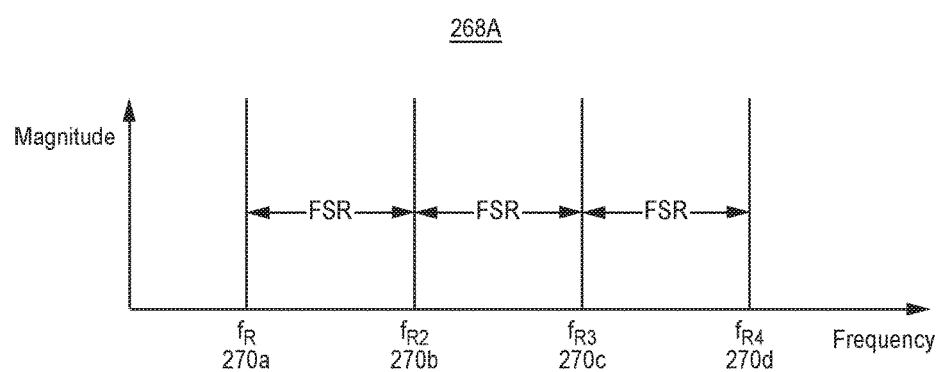
FIG. 2A illustrates one embodiment of a frequency response of an optical ring resonator without Bragg gratings.

FIG. 2A illustrates one embodiment of a frequency response of an optical ring resonator without Bragg gratings 268. The resonator has a first resonant frequency ($f_R$) 270a and subsequent resonant frequencies $f_{R2}$ 270b, $f_{R3}$ 270c, and $f_{R4}$ 270d, where each pair of proximate resonant frequencies is separated by a free spectral range (FSR). When at least one Stokes signal is desirable, the frequency of the input optical signal 154 and the Stokes signals are designed to have frequencies equal to or substantially equal to resonant frequencies of the optical ring resonator.

In one embodiment, the input optical signal 154 would have a frequency equal to $f_R$ 270a. The first order Stokes signal would have a frequency of $f_{R2}$ 270b. The second order Stokes signal would have a frequency of $f_{R3}$ 270c, and so on.

Figure 2B:
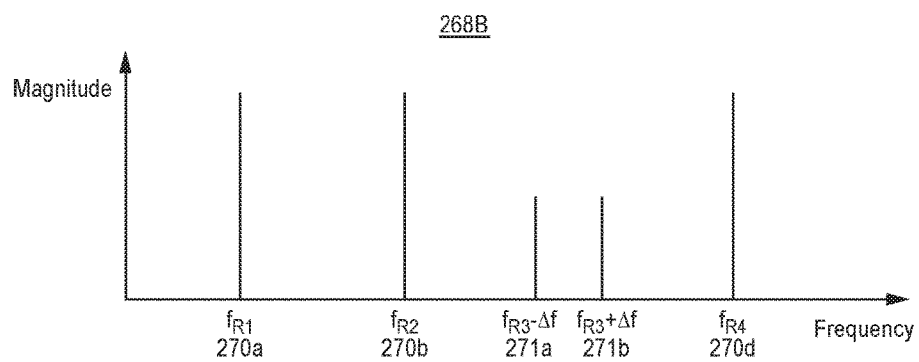
FIG. 2B illustrates one embodiment of a frequency response of an optical ring resonator with Bragg gratings.

FIG. 2B illustrates the frequency response of an optical ring resonator with Bragg gratings 268B. In the illustrated embodiment, the center frequency or Bragg frequency, $f_B$, of the notch filter is designed to align with the third resonant frequency $3f_R$ to suppress generation of, e.g. a second order, Stokes signal at that frequency. In this embodiment, rather than just the third resonant frequency $f_{R3}$ 270c being eliminated, two split resonances $f_{R3}-\Delta f$ 271a and $f_{R3}+\Delta f_R$ 271b (which are equidistant on either side of where the third resonant frequency would lie) are created adjacent to one another.

The minimum separation of the two split resonances $f_{R3}-\Delta f$ 271a and $f_{R3}+\Delta f_R$ 271b is dependent upon the 3 dB bandwidth of the Brillouin gain of the material used to form the optical ring resonator. For example, for silica fiber, the 3 dB bandwidth of the Brillouin gain is about forty Megahertz. For silicon nitride waveguides, the 3 dB bandwidth of the Brillouin gain is about two hundred Megahertz.

The frequency separation of the two split resonances $f_{R3}-\Delta f$ 271a and $f_{R3}+\Delta f_R$ 271b is dependent upon the Q factor of the Bragg grating. The higher the Q factor of the Bragg grating, the greater the increase in spectral separation between the two split resonances $f_{R3}-\Delta f$ 271a and $f_{R3}+\Delta f_R$ 271b.

In one embodiment, the Q factor of the grating ranges from 200,000 to 1,000,000. However, even with a Bragg grating having a relatively low Q factor, e.g. where $D_1/D_2$ equals about 0.97, the two split resonances will be separated by several hundreds of Megahertz which is sufficiently far removed from the proximate frequency band of Brillouin gain, e.g. which is substantially in the center of the two split resonances. Because there is no longer a resonance at the third resonant frequency $f_{R3}$ 270c, the, e.g. second order, Stokes signal at the third resonant frequency $f_{R3}$ 270c is suppressed.

Figure 2C:
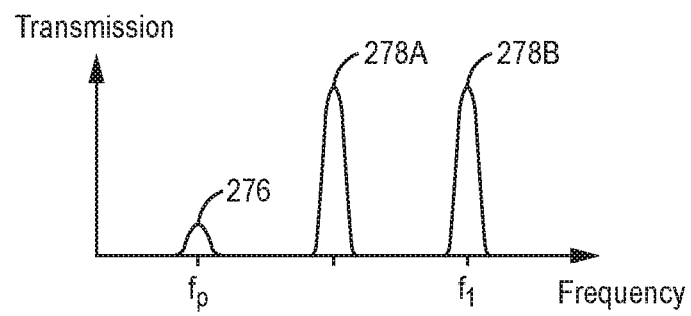
FIG. 2C illustrates one embodiment of a pump signal, a first order Stokes signal, and a second order Stokes signal in an optical ring resonator.

FIG. 2C illustrates one embodiment of a pump signal, a first order Stokes signal, and a second order Stokes signal in an optical ring resonator 275A. The pump signal 276 has a sufficiently high power to create the first order Stokes signal 278A, and the second order Stokes signal 278B in the optical ring resonator 150. In another embodiment, the second order Stokes signal 268B is generated when the power level of the pump signal is four times the power level of the pump signal that initially generates the first order Stokes signal 268A.

Figure 2D:
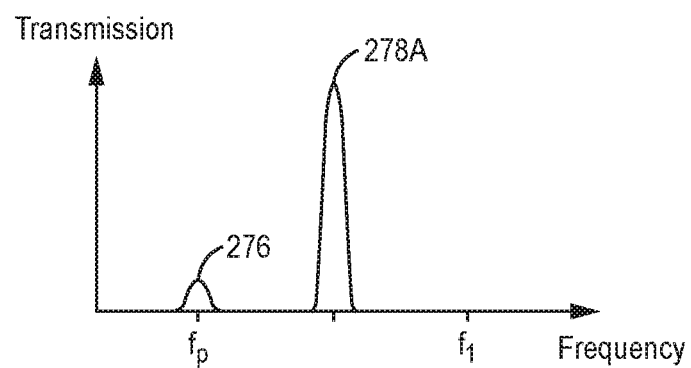
FIG. 2D illustrates one embodiment of a pump signal and a first order Stokes signal in an optical ring resonator with an integrated Bragg grating

FIG. 2D illustrates one embodiment of a pump signal and a first order Stokes signal in an optical ring resonator with an integrated Bragg grating 275B. The integrated Bragg grating of the optical resonator is designed to have a center frequency, or a Bragg frequency, that is substantially equal to the frequency of the second order Stokes signal, or $f_B \approx 3 \cdot f_R$. Although, the pump signal 276 has a sufficiently high power to create the first order Stokes signal 278A and the second order Stokes signal 278B in the optical ring resonator with the integrated Bragg grating 150, the second order Stokes signal 278B is suppressed because of two split resonances $f_{R3}-\Delta f$ 271a and $f_{R3}+\Delta f_R$ 271b created by the Bragg grating are sufficiently far from the 3 dB band of the Brillouin gain for the second order Stokes signal. In another embodiment, the power level of the first order Stokes signal can be increased higher than if the second order Stokes signal was not suppressed.

Figure 3:
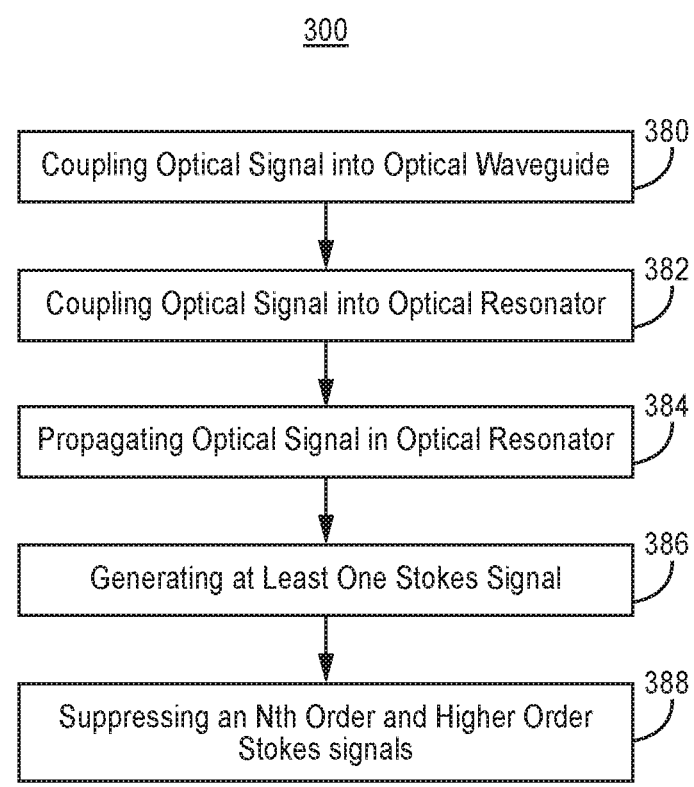
FIG. 3 illustrates one embodiment of a method of operation of an optical ring resonator with an integrated Bragg grating.

FIG. 3 illustrates one embodiment of a method of operation of an optical ring resonator with an integrated Bragg grating 300. To the extent that the embodiment of method 300 shown in FIG. 3 is described herein as being implemented in the systems shown in FIGS. 1A through 2D, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner).

In one embodiment, in block 380, couple an optical signal into an optical waveguide. In block 382, couple an optical signal into an optical resonator, e.g. with a Bragg grating. In another embodiment, couple the optical signal into the optical resonator from the optical waveguide. In block 384, propagate the optical signal around the optical resonator, e.g. with the Bragg grating. In block 386, generate at least one Stokes signal having order(s) equal to or less than N−1. In another embodiment, N equals two, and generate a first order Stokes signal.

In block 388, suppress Nth order and higher order Stokes signals in the optical resonator, e.g. with a Bragg grating. In one embodiment, suppress the Nth order and higher order Stokes signals by generating a back reflected signal arising from signals, e.g. reflected by the Bragg grating, being in phase and adding constructively; the back reflected signal is at a center frequency (e.g. Bragg frequency), in the optical resonator (e.g. with the Bragg grating), that is substantially similar to the center frequency of a band of Brillouin gain corresponding to an Nth order Stokes signal. In another embodiment, suppress second and higher order Stokes signals.

The optical ring resonator with the integrated Bragg grating 150 can be used in a stimulated Brillouin scattering (SBS) ring laser gyroscope to eliminate higher order Stokes signals, e.g. second order and higher order Stokes signals. SBS ring laser gyroscopes are desirable because Stokes frequencies have low phase noise, and thus the SBS ring laser can accurately determine rotation around its input axis. When an optical ring resonator with integrated Bragg grating 150 is implemented into an SBS ring laser gyroscope, the power level of the Stokes frequency can be increased so as to also increase the signal to noise ratio and thus the sensitivity of the SBS ring laser gyroscope.

Figure 4A:
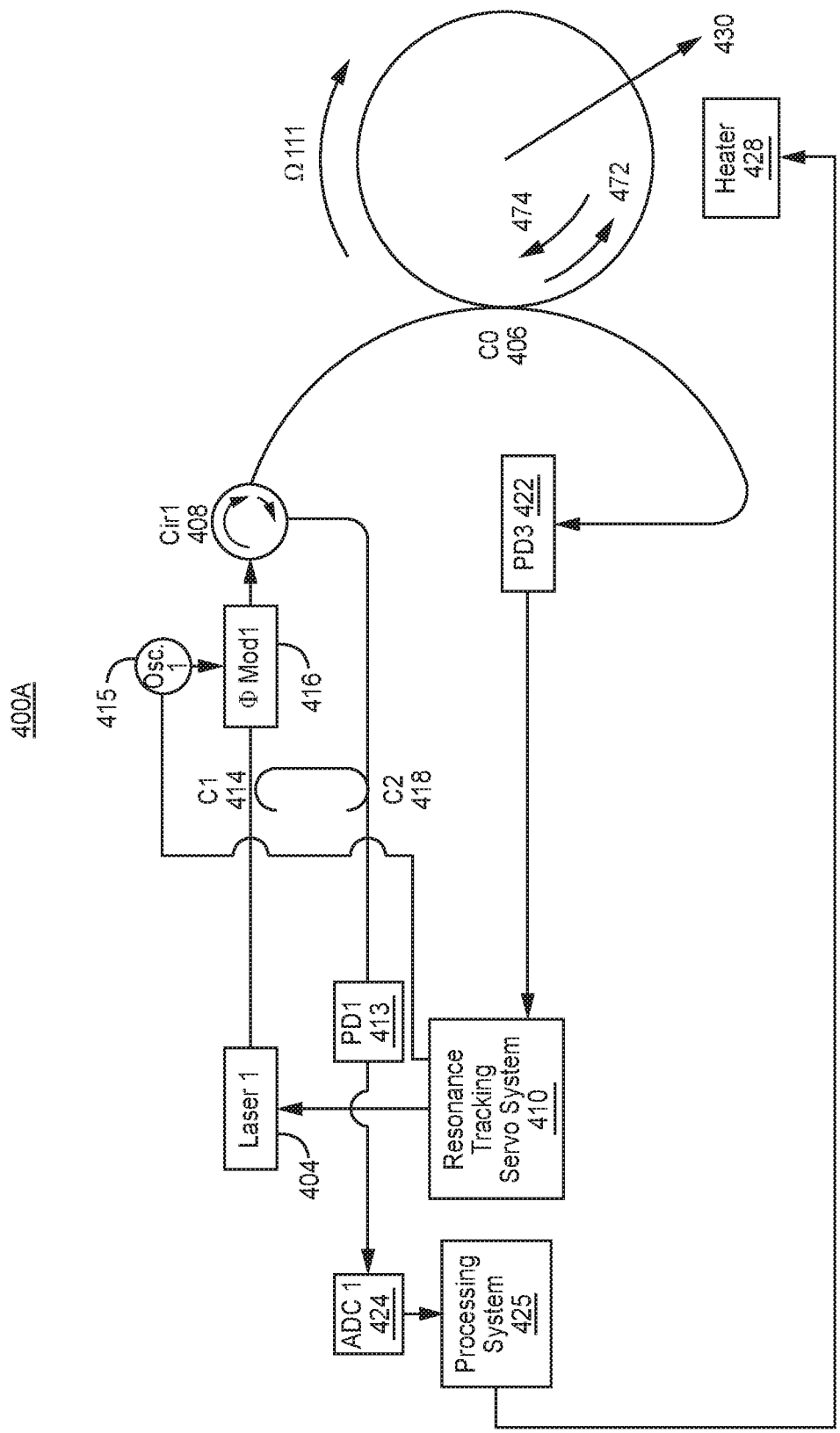
FIG. 4A illustrates one embodiment of a SBS ring single laser gyroscope including an optical ring resonator with the integrated Bragg grating.

FIG. 4A illustrates one embodiment of a SBS ring single laser gyroscope including an optical ring resonator with the integrated Bragg grating 400A. The SBS ring single laser gyroscope including an optical ring resonator with the integrated Bragg grating 400A includes an optical ring resonator with the integrated Bragg grating 450, and is used to measure angular rotation (Ω) 411 around an input axis 430 of the optical ring resonator with the integrated Bragg grating 450.

The SBS ring single laser gyroscope including an optical ring resonator with the integrated Bragg grating 400A illustrated in FIG. 4 is one example of how to construct such a gyroscope. As is further illustrated below, other combinations of optical components may be used to implement the SBS ring single laser gyroscope including an optical ring resonator with the integrated Bragg grating.

The SBS ring single laser gyroscope including an optical ring resonator with the integrated Bragg grating 400A includes a first laser 404. The first laser 404 includes a first input that is coupled to a first output of a resonance tracking servo system 410. In one embodiment, the first laser 404 has a second input configured to be coupled to an output of a processing system 425. The processing system 425 is also configured to be coupled to and to control the power level of the first laser 404. An output of the first laser 404 is coupled to a first port of a first optical coupler (C1) 414.

In one embodiment, the resonance tracking servo system 110 includes PDH feedback control electronics, a subtractor, and an integrator as is illustrated in U.S. Pat. No. 9,537,283, which is hereby incorporated by reference in its entirety. The resonance tracking servo system 110 is respectively part of a Pound-Drever-Hall servo loop which is subsequently described in more detail.

In one embodiment, the processing system 425 includes a processor coupled to a memory. In another embodiment, the processor may be implemented, in whole or in part, with a state machine or a field programmable gate array. In a further embodiment, the memory includes software, executed on the processor, to determine a parameter corresponding to the angular rotation rate (Ω) 411 around an input axis 430 of the optical ring resonator with the integrated Bragg grating 450.

A second port of the first optical coupler 414 is coupled to a first input of a first phase modulator (Φ Mod1) 416. A third port of the first optical coupler 414 is coupled to a first port of a second coupler (C2) 418.

A first oscillator (Osc. 1) 415 is coupled to a second input of the first phase modulator 416. The first oscillator 415 is coupled to, and its frequency is controlled by, the resonance tracking servo system 410. In one embodiment, the first oscillator 415 is a signal generator configured to generate a sinusoidal signal at a single frequency, e.g. within a range of one kHz and five GHz. The first oscillator 415, the first phase modulator 416, a third photodetector (PD3) 422, and the resonance tracking servo system 410 comprise a Pound-Drever-Hall servo loop.

An output of the first phase modulator 416 is coupled to a first port of a first optical circulator (Cir1) 408. A second port and a third port of the first optical circulator 408 are respectively coupled to a first port of a resonator optical coupler (C0) 406 and a second port of the second optical coupler 418. The first circulator 408 directs light from the first port to the second port of the first circulator 408, so that light generated from the first laser 404 is injected to the optical resonator 402 in a counter-clockwise direction. A third port and a fourth port of the resonator optical coupler 406 are respectively coupled to a first port and a second port of the optical resonator with the integrated Bragg grating 450.

The first order Stokes signal, generated in the optical ring resonator with the integrated Bragg grating 450 by the pump signal from the first laser 404, propagates in the clockwise direction of the optical ring resonator with the integrated Bragg grating 450. This first order Stokes signal is coupled out of the optical ring resonator with the integrated Bragg grating 450 at the first port of the resonator optical coupler 406 and propagates from the second port of the first circulator 408 to its third port, and is coupled to the second port of the second optical coupler 418, and then to an input of a first photodetector (PD1) 413 (e.g. the second and third ports of the second optical coupler 418 combines the pump signal from the first laser 404 with the corresponding first order Stokes signal). A second port of the resonator optical coupler 406 is coupled to the third photodetector 422.

A third port and a fourth port of the resonator optical coupler 406 are respectively coupled to a first port and a second port of an optical ring resonator with the integrated Bragg grating 450. In one embodiment, the optical ring resonator with the integrated Bragg grating 450 is a coil of optical fiber (coil). However, in other embodiments, different waveguides, e.g. made from silicon nitride for example by semiconductor processing techniques, and different geometries, e.g. triangular, can be used.

The output of the third photodetector 422 is coupled to an input of the resonance tracking servo system 410. The output of the first photodetector 413 is respectively coupled to an input of a first analog to digital converter 424. An output of the first analog to digital converter 424 is coupled to the processing system 425.

In one embodiment, a heater 428 is thermally coupled to the optical ring resonator with the integrated Bragg grating 450. In another embodiment, the heater 428 is coupled to the processing system 425 which can activate and deactivate the heater 428, and adjust the temperature of the heater 128. In a further embodiment, the heater 428 is used to heat the optical ring resonator with the integrated Bragg grating 450, and thus adjust the resonant frequency of the optical ring resonator with the integrated Bragg grating, e.g. so that it is closer to the frequencies of the pump signals emitted by the first laser 404.

In one embodiment, the processing system 425 is configured to generate a signal, representative of the angular rotation rate ($\Omega$) 411, around an input axis 430 of the optical ring resonator with the integrated Bragg grating 450. The input axis 430 is parallel to the center axis of the optical ring resonator with the integrated Bragg grating 450, e.g. the coil. In another embodiment, the input axis 430 is a centerline through the optical ring resonator with the integrated Bragg grating 450, e.g. the coil. However, this is just one example. The input axis 430 need not be the centerline through the optical ring resonator with the integrated Bragg grating 450, e.g. the coil.

The first laser 404 generates a first laser pump signal. The first laser pump signal 472 propagates counter-clockwise in the optical ring resonator with the integrated Bragg grating 450. If the power level of the first laser pump signal 472 is sufficiently high, a set of one or more Stokes signals is generated for the pump signal.

For example, a first laser first order Stokes signal 474 is generated from the first laser pump signal 472. The first laser first order Stokes signal 474 propagates clockwise (opposite the pump signal). A first beat signal, $f_{B1}$, is generated by the first photodetector 413A as a result of the first laser first order Stokes signal 474 and the first laser pump signal 472A being incident on the first photodetector 413. Angular rotation rate ($\Omega$) 411 around which the input axis 430 is equal to $(n_e * \lambda * \Delta f_R * P)/(4*A)$, where $\lambda$ is substantially equal to the average wavelength of the first laser pump signal and the second laser pump signal, P is the length of the perimeter of the optical resonator 402 (e.g. the coil), A is the area enclosed by the optical resonator 402 (e.g. the coil), and $n_e$ is the effective refractive index of the optical resonator 402. $\Delta f_R$ is equal to $f_{B1}$.

The first laser pump signal 472 is incident upon the third photodetector 422, which generates an electrical signal corresponding to the power level of the first laser pump signal 472. This electrical signal is used to adjust the frequency of the first laser pump signal 472 so that it tracks a resonant frequency of the optical ring resonator with the integrated Bragg grating 450.

In one embodiment, it is desirable to suppress the second and higher order Stokes signals that would be generated by the first laser first order Stokes signal 474. In another embodiment, this can be done by regulating the power level of the first laser pump signal 472 so that it is lower, e.g. than four times the power level that gives rise to first Stoke signal. However, lower power pump signals result in lower power first order Stokes signals. As stated above, higher power levels of the first Stoke signals are desirable to increase the signal to noise levels, and thus the sensitivity, of the SBS ring laser gyroscope including an optical ring resonator with the integrated Bragg grating 300. Therefore, second and higher order Stokes signals are suppressed by the optical ring resonator with the integrated Bragg grating 450 rather than by limiting the power level of the first laser pump signal 472. As a result, the power level of the first laser pump signal 472 can be increased to increase the power level of the first order Stokes signals.

Figure 4B:
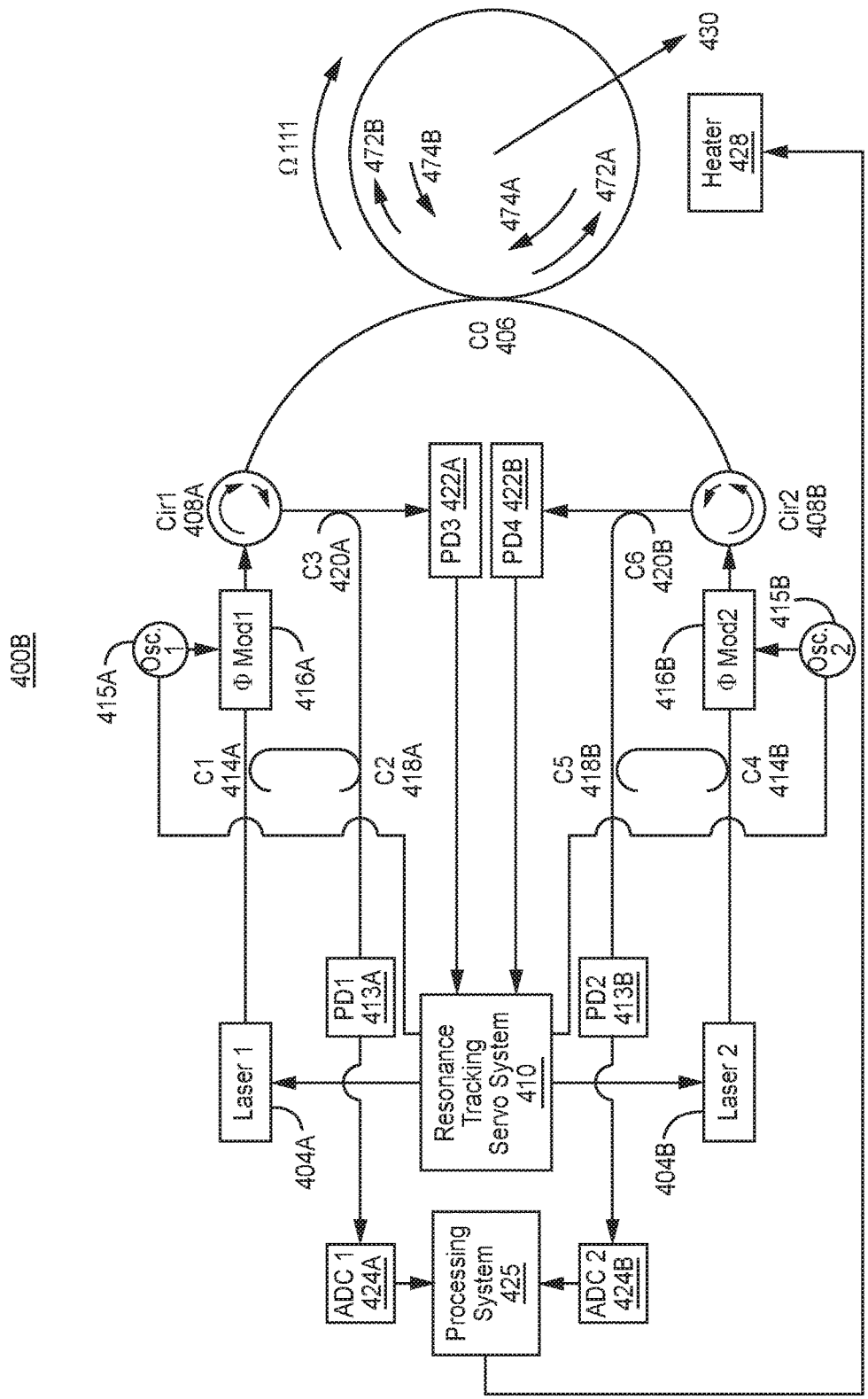
FIG. 4B illustrates one embodiment of a SBS ring dual laser gyroscope including an optical ring resonator with the integrated Bragg grating.

FIG. 4B illustrates one embodiment of a SBS ring dual laser gyroscope including an optical ring resonator with the integrated Bragg grating 400B. The SBS ring dual laser gyroscope including an optical ring resonator with the integrated Bragg grating 400B includes an optical ring resonator with the integrated Bragg grating 450, and is used to measure angular rotation ($\Omega$) 411 around an input axis 430 of the optical ring resonator with the integrated Bragg grating 450.

The SBS ring dual laser gyroscope including an optical ring resonator with the integrated Bragg grating 400B illustrated in FIG. 4 is one example of how to construct such a gyroscope. As is further illustrated below, other combinations of optical components may be used to implement the SBS ring dual laser gyroscope including an optical ring resonator with the integrated Bragg grating.

The SBS ring dual laser gyroscope including an optical ring resonator with the integrated Bragg grating 400B includes a first laser 404A and a second laser 404B. The first laser 404A includes a first input that is coupled to a first output of a resonance tracking servo system 410. The second laser 404B includes a first input that is coupled to a second output of a resonance tracking servo system 410. In one embodiment, the first laser 404A and the second laser 404B each have a second input configured to be coupled to output(s) of a processing system 425. The processing system 425 is also configured to be coupled to and to control the power levels of the first laser 404A and the second laser 404B.

In one embodiment, the resonance tracking servo system 110 includes PDH feedback control electronics, a subtractor, and an integrator as is illustrated in U.S. Pat. No. 9,537,283, which is hereby incorporated by reference in its entirety. The resonance tracking servo system 110 is respectively part of a first Pound-Drever-Hall servo loop and a second Pound-Drever-Hall servo loop which are subsequently described in more detail.

An output of the first laser 404A is coupled to a first port of a first optical coupler (C1) 414A. An output of the second laser 404B is coupled to a first port of a fourth optical coupler (C4) 414B.

In one embodiment, the processing system 425 includes a processor coupled to a memory. In another embodiment, the processor may be implemented, in whole or in part, with a state machine or a field programmable gate array. In a further embodiment, the memory includes software, executed on the processor, to determine a parameter corresponding to the angular rotation rate ($\Omega$) 411 around an input axis 430 of the optical ring resonator with the integrated Bragg grating 450.

A second port of the first optical coupler 414A is coupled to a first input of a first phase modulator ($\Phi\pi$Mod1) 416A. A third port of the first optical coupler 414A is coupled to a first port of a second coupler (C2) 418A. A second port of the fourth optical coupler 414B is coupled to a first input of a second phase modulator ($\Phi$ Mod2) 416B. A third port of the fourth optical coupler 414B is coupled to a first port of a fifth coupler (C5) 418B.

A first oscillator (Osc. 1) 415A is coupled to a second input of the first phase modulator 416A. A second oscillator (Osc. 2) 415B is coupled to a second input of the second phase modulator 116B. The first oscillator 415A and the second oscillator 415B are coupled to, and their frequencies are controlled by, the resonance tracking servo system 110. In one embodiment, each of the first oscillator 415A and the second oscillator 415B are signal generators configured to generate sinusoidal signals at a single frequency, e.g. within a range of one kHz and five GHz. The first oscillator 415A, the first phase modulator 416A, the sixth optical coupler (C6) 420B, a fourth photodetector (PD4) 422B, and the resonance tracking servo system 410 comprise the first Pound-Drever-Hall servo loop; the second oscillator 415B, the second phase modulator 416B, the third coupler (C3) 420A, the third photodetector (PD3) 422A, and the resonance tracking servo system 410 comprise the second Pound-Drever-Hall servo loop.

An output of the first phase modulator 416A is coupled to a first port of a first optical circulator (Cir1) 408A. An output of the second phase modulator 416B is coupled to a first port of a second optical circulator (Cir2) 408B. A second port and a third port of the first optical circulator 408A are respectively coupled to a first port of a resonator optical coupler (C0) 406 and a first port of a third optical coupler 420A. The first circulator 408A directs light from the first port to the second port of the first circulator 408A, so that light generated from the first laser 404A is injected to the optical resonator 402 in a counter-clockwise direction. A second port and a third port of the second optical circulator 408B are respectively coupled to a second port of the resonator optical coupler 406 and a first port of a sixth optical coupler 420B. The second circulator 408B directs light from the first port to the second port of the second circulator 408B, so that light generated from the second laser 404B is injected to the optical ring resonator with the integrated Bragg grating 450 in a clockwise direction. A third port and a fourth port of the resonator optical coupler 406 are respectively coupled to a first port and a second port of the optical resonator with the integrated Bragg grating 450.

The first order Stokes signal, generated in the optical ring resonator with the integrated Bragg grating 450 by the pump signal from the first laser 404A, propagates in the clockwise direction of the optical ring resonator with the integrated Bragg grating 450. This first order Stokes signal is coupled out of the optical ring resonator with the integrated Bragg grating 450 at the first port of the resonator optical coupler 406 and propagates from the second port of the first circulator 408A to its third port, and is coupled to the first port of the third optical coupler 420A. A second port and a third port of the third optical coupler 420A are respectively coupled to an input of a first photodetector (PD1) 413A (e.g. through second and third ports of the second optical coupler 418A which combines the pump signal from the first laser 404A with the corresponding first order Stokes signal), and an input of a third photodetector 422A.

The first order Stokes signal, generated in the optical ring resonator with the integrated Bragg grating 450 by the pump signal from the second laser 404B, propagates in the counter-clockwise direction of the optical ring resonator with the integrated Bragg grating 450. This first order Stokes signal is coupled out of the optical ring resonator with the integrated Bragg grating 450 at the second port of the resonator optical coupler 406, and propagates from the second port of the second circulator 408B to the third port, and is coupled to the first port of the sixth optical coupler 420B. A second port and a third port of the sixth optical coupler 420B are respectively coupled to an input of a second photodetector (PD2) 413B (e.g. through second and third ports of the fifth optical coupler 418B which combines the pump signal from the second laser 404B with the corresponding first order Stokes signal), and an input of a fourth photodetector 422B.

A third port and a fourth port of the resonator optical coupler 406 are respectively coupled to a first port and a second port of an optical ring resonator with the integrated Bragg grating 450. In one embodiment, the optical ring resonator with the integrated Bragg grating 450 is a coil of optical fiber (coil). However, in other embodiments, different waveguides, e.g. made from silicon nitride for example by semiconductor processing techniques, and different geometries, e.g. triangular, can be used.

The outputs of the third photodetector 422A and the fourth photodetector 422B are respectively coupled to a first input and a second input of the resonance tracking servo system 410. The outputs of the first photodetector 413A and the second photodetector 413B are respectively coupled to inputs of a first analog to digital converter 424A and a second analog to digital converter 424B. Outputs of the first analog to digital converter 424A and the second analog to digital converter 424B are coupled to the processing system 425.

In one embodiment, a heater 428 is thermally coupled to the optical ring resonator with the integrated Bragg grating 450. In another embodiment, the heater 428 is coupled to the processing system 425 which can activate and deactivate the heater 428, and adjust the temperature of the heater 128. In a further embodiment, the heater 428 is used to heat the optical ring resonator with the integrated Bragg grating 450, and thus adjust the resonant frequency of the optical ring resonator with the integrated Bragg grating, e.g. so that it is closer to the frequencies of the pump signals emitted by the first laser 404A and the second laser 404B.

In one embodiment, the processing system 425 is configured to generate a signal, representative of the angular rotation rate ($\Omega$) 411, around an input axis 430 of the optical ring resonator with the integrated Bragg grating 450. The input axis 430 is parallel to the center axis of the optical ring resonator with the integrated Bragg grating 450, e.g. the coil. In another embodiment, the input axis 430 is a centerline through the optical ring resonator with the integrated Bragg grating 450, e.g. the coil. However, this is just one example. The input axis 430 need not be the centerline through the optical ring resonator with the integrated Bragg grating 450, e.g. the coil.

The first laser 404A and the second laser 404B respectively generate a first laser pump signal 472A and a second laser pump signal 472B. The first laser pump signal 472A and the second laser pump signal 472B respectively propagate counter-clockwise and clockwise in the optical ring resonator with the integrated Bragg grating 450. If the power levels of the first laser pump signal 472A and the second laser pump signal 472B are sufficiently high, a set of one or more Stokes signals is respectively generated for each pump signal.

For example, a first laser first order Stokes signal 474A and a second laser first order Stokes signal 474B are respectively generated from the first laser pump signal 472A and the second laser pump signal 472B. The first laser first order Stokes signal 474A and the second laser first order Stokes signal 474B propagate clockwise and counter-clockwise (opposite the corresponding pump signals). A first beat signal, $f_{B1}$, is generated by the first photodetector 413A as a result of the first laser first order Stokes signal 474A and the first laser pump signal 472A being incident on the first photodetector 413A. A second beat signal, $f_{B2}$, is generated by the second photodetector 413B as a result of the second laser first order Stokes signal 474B and the second laser pump signal 472B being incident upon the second photodetector 413B. Angular rotation rate ($\Omega$) 411 around which the input axis 430 is equal to $(n_e * \lambda * \Delta f_R * P)/(4 * A)$, where $\lambda$, is substantially equal to the average wavelength of the first laser pump signal and the second laser pump signal, P is the length of the perimeter of the optical resonator 402 (e.g. the coil), A is the area enclosed by the optical resonator 402 (e.g. the coil), and $n_e$ is the effective refractive index of the optical resonator 402. $\Delta f_R$ is equal to $(f_{B1} - f_{B2})/2$.

The first laser pump signal 472A is incident upon the fourth photodetector 422B, which generates an electrical signal corresponding to the power level of the first laser pump signal 472A. This electrical signal is used to adjust the frequency of the first laser pump signal 472A so that it tracks a resonant frequency of the optical ring resonator with the integrated Bragg grating 450. The second laser pump signal 472B is incident upon the third photodetector 422A, which generates an electrical signal corresponding to the power level of the second laser pump signal 472B. This electrical signal is used to adjust the frequency of the second laser pump signal 472B so that it tracks a resonant frequency of the optical ring resonator with the integrated Bragg grating 450.

In one embodiment, it is desirable to suppress the second and higher order Stokes signals that would be generated by the first laser first order Stokes signal 474A and the second laser first order Stokes signal 474B. In another embodiment, this can be done by regulating the power levels of the first laser pump signal 472A and the second laser pump signal 472B so that they are lower, e.g. than four times the power level that gives rise to corresponding first Stoke signals. However, lower power pump signals result in lower power first order Stokes signals. As stated above, higher power levels of the first Stoke signals are desirable to increase the signal to noise levels, and thus the sensitivity, of the SBS ring laser gyroscope including an optical ring resonator with the integrated Bragg grating 300. Therefore, second and higher order Stokes signals are suppressed by the optical ring resonator with the integrated Bragg grating 450 rather than by limiting the power levels of the first laser pump signal 472A and the second laser pump signal 372B. As a result, the power levels of the first laser pump signal 472A and the second laser pump signal 372B can be increased to increase the power levels of the corresponding first order Stokes signals.

FIGS. 4A and 4B illustrate examples of combinations of optical couplers and/or circulators that can be used implement an SBS ring laser gyroscope. For example, the SBS ring laser gyroscope can be implemented without the use of optical circulators. Thus, for example, a second optical resonator optical coupler can be coupled to the side of the optical resonator with a Bragg grating 450 opposite the resonator optical coupler 406, in lieu of the optical circulators. The second resonator optical coupler would also be coupled to the third optical coupler 420A and the sixth optical coupler 420B to provide output signals, Stokes and laser pump signals, to the first photodetector 413A, the second photodetector 313B, the third photodetector 422A, and the fourth photodetector 422B.

Terms of relative position as used in this application are defined based on a plane parallel to, or in the case of the term coplanar—the same plane as, the conventional plane or working surface of a layer, wafer, or substrate, regardless of orientation. The term "horizontal" or "lateral" as used in this application are defined as a plane parallel to the conventional plane or working surface of a layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a layer, wafer, or substrate, regardless of orientation. The term "coplanar" as used in this application is defined as a plane in the same plane as the conventional plane or working surface of a layer, wafer, or substrate, regardless of orientation.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes an apparatus, comprising: an optical resonator including a surface; wherein a Bragg grating is formed at least part of the surface of the optical resonator; and wherein the Bragg grating has a Bragg frequency substantially equal to a center frequency of an Nth order Brillouin gain region capable of generating an Nth order Stokes signal.

Example 2 includes the apparatus of Example 1, further comprising a coupler proximate to the optical resonator.

Example 3 includes the apparatus of Examples 1-2, wherein the Bragg grating is formed by periodic notches in the at least part of the surface of the optical resonator.

Example 4 includes the apparatus of Example 3, wherein the periodic notches comprise notches having a quadrilateral cross-section.

Example 5 includes the apparatus of Examples 3-4 wherein the ratio of a depth of each notch to a width or diameter of a waveguide, forming the resonator, Example 0.97 or lower.

Example 6 includes the optical resonator of Examples 1-5, wherein the optical resonator is an optical ring resonator.

Example 7 includes the optical resonator of Examples 1-6, wherein the optical resonator is formed from optical fiber.

Example 8 includes the optical resonator of Examples 1-7, where the Nth Stokes signal is the second order Stokes signal.

Example 9 includes a method, comprising: coupling an optical signal into an optical resonator; propagating the optical signal in the optical resonator; generating at least one Stokes signal having order(s) equal to or less than N−1; and suppressing Nth order and higher order Stokes signals in the optical resonator.

Example 10 includes the method of Example 9, further comprising coupling the optical signal into an optical waveguide; and wherein coupling the optical signal into the optical resonator portion comprises coupling the optical signal from the optical waveguide into the optical resonator.

Example 11 includes the method of Examples 9-10, wherein coupling the optical signal into the optical resonator comprises coupling the optical signal in an optical ring resonator; wherein propagating the optical signal in the optical resonator comprises propagating the optical signal in the optical ring resonator; and wherein suppressing the Nth order and higher order Stokes signals in the optical resonator comprises suppressing the Nth order and higher order Stokes signals in an optical ring resonator.

Example 12 includes the method of Examples 9-11, wherein suppressing the Nth order and higher order Stokes signals in the optical resonator comprises wherein suppressing the second order and higher order Stokes signals in the optical resonator.

Example 13 includes the method of Examples 9-12, wherein suppressing the Nth order and higher order Stokes signals in the optical resonator comprises generating a back reflected signal arising from signals, reflected by a Bragg grating on the optical resonator, being in phase and adding constructively.

Example 14 includes A gyroscope, comprising: a first laser configured to generate a first laser pump signal; an optical resonator, including a surface, coupled to the first laser; wherein a Bragg grating is formed at least part of the surface of the optical resonator; wherein the Bragg grating has a Bragg frequency substantially equal to the center frequency of an Nth order Brillouin gain region capable of generating an Nth order Stokes signal; an input axis parallel to a center axis of the optical resonator; wherein the first laser pump signal generates a first order Stokes signal in the optical resonator that propagates in an opposite direction, around the optical resonator, of the first laser pump signal; a first photodetector coupled to the optical resonator; a second photodetector coupled to the optical resonator and configured to generate a first signal in response to a first portion of the first pump signal coupled out of the optical resonator; wherein the first photodetector is configured to generate a first beat signal in response to a first Stokes signal, corresponding to the first pump signal, which is coupled out of the optical resonator and a second portion of the first pump signal; a resonance tracking servo system coupled to the first laser and the second photodetector; a processing system coupled to the first photodetector; wherein the resonance tracking servo system is configured to alter the frequency of the first laser pump signal based upon the first signal; and wherein the processing system is configured to generate data representative of an angular rotation rate around the input axis based upon the first beat signal.

Example 15 includes the gyroscope of Example 14, further comprising: a second laser configured to generate a second laser pump signal, and coupled to the optical resonator and resonance tracking servo system; wherein the second laser pump signal generates a first order Stokes signal in the optical resonator that propagates in an opposite direction, around the optical resonator, of the second laser pump signal; a third photodetector coupled to the optical resonator and the processing system; a fourth photodetector coupled to the optical resonator and the resonance tracking servo system, and configured to generate a second signal in response to a first portion of the second pump signal coupled out of the optical resonator; wherein the third photodetector is configured to generate a second beat signal in response to a first Stokes signal, corresponding to the second pump signal, which is coupled out of the optical resonator and a second portion of the second pump signal; wherein the resonance tracking servo system is configured to alter the frequency of the second laser pump signal based upon the second signal; and wherein the processing system is configured to generate data representative of an angular rotation rate around the input axis based upon the first beat signal comprises wherein the processing system is configured to generate data representative of an angular rotation rate around the input axis based upon the first beat signal and the second beat signal.

Example 16 includes the apparatus of Examples 14-15, wherein the Bragg grating is formed by periodic notches in the at least part of the surface of the optical resonator.

Example 17 includes the apparatus of Example 16, wherein the periodic notches comprise notches having a quadrilateral cross-section.

Example 18 includes the optical resonator of Examples 14-17, wherein the optical resonator is an optical ring resonator.

Example 19 includes the optical resonator of Examples 14-18, wherein the optical resonator is formed from optical fiber.

Example 20 includes the optical resonator of Examples 14-19, where the Nth Stokes signal is the second order Stokes signal.

What is claimed is:

1. A gyroscope, comprising:
    a first laser configured to generate a first laser pump signal;
    an optical resonator comprising a waveguide, including Brillouin gain material, on a substrate and coupled to the first laser;
    wherein the optical resonator has resonant frequencies substantially equal to a frequency of an optical signal configured to be coupled into the optical resonator and to a frequency of at least one Stokes signal, where each of the at least one Stokes signal has an order equal to or less than N-1, and where each of the at least one Stokes signal is configured to be generated by the Brillouin gain material;
    a Bragg grating with periodic notches that are on parallel sides, of the waveguide, which are perpendicular to the substrate;
    wherein the Bragg grating has a Bragg frequency substantially equal to the center frequency of the Nth order Stokes signal;
    an input axis parallel to a center axis of the optical resonator;
    wherein the first laser pump signal generates a first order Stokes signal in the optical resonator that propagates in an opposite direction, around the optical resonator, of the first laser pump signal;
    a first photodetector coupled to the optical resonator;

a second photodetector coupled to the optical resonator and configured to generate a first signal in response to a first portion of the first pump signal coupled out of the optical resonator;

wherein the first photodetector is configured to generate a first beat signal in response to a first Stokes signal, corresponding to the first pump signal, which is coupled out of the optical resonator and a second portion of the first pump signal;

resonance tracking servo system circuitry coupled to the first laser and the second photodetector;

processing system circuitry coupled to the first photodetector;

wherein the resonance tracking servo system circuitry is configured to alter the frequency of the first laser pump signal based upon the first signal; and wherein the processing system circuitry is configured to generate data representative of an angular rotation rate around the input axis based upon the first beat signal.

2. The gyroscope of claim 1, further comprising:

a second laser configured to generate a second laser pump signal, and coupled to the optical resonator and resonance tracking servo system circuitry;

wherein the second laser pump signal generates a first order Stokes signal in the optical resonator that propagates in an opposite direction, around the optical resonator, of the second laser pump signal;

a third photodetector coupled to the optical resonator and the processing system circuitry;

a fourth photodetector coupled to the optical resonator and the resonance tracking servo system, and configured to generate a second signal in response to a first portion of the second pump signal coupled out of the optical resonator;

wherein the third photodetector is configured to generate a second beat signal in response to a first Stokes signal, corresponding to the second pump signal, which is coupled out of the optical resonator and a second portion of the second pump signal;

wherein the resonance tracking servo system circuitry is configured to alter the frequency of the second laser pump signal based upon the second signal; and wherein the processing system circuitry is configured to generate data representative of an angular rotation rate around the input axis based upon the first beat signal and the second beat signal.

3. The gyroscope of claim 1, wherein the periodic notches comprise notches having a quadrilateral cross-section.

4. The gyroscope of claim 1, wherein the optical resonator is an optical ring resonator.

5. The gyroscope of claim 1, where the at least one Stokes signal is a first order Stokes signal.

6. The gyroscope of claim 4, further comprising a coupler proximate to the optical resonator.

7. The gyroscope of claim 1, wherein the ratio of a depth of each notch to a width of a corresponding notch is 0.97 or lower.

* * * * *

UNITED STATES PATENT AND TRADEMARK OFFICE
CERTIFICATE OF CORRECTION

| | | |
|---|---|---|
| PATENT NO. | : 10,992,097 B2 | Page 1 of 1 |
| APPLICATION NO. | : 15/618833 | |
| DATED | : April 27, 2021 | |
| INVENTOR(S) | : Matthew Wade Puckett, Karl D. Nelson and Jianfeng Wu | |

It is certified that error appears in the above-identified patent and that said Letters Patent is hereby corrected as shown below:

At Column 16, Claim 6, Line 24, please replace "claim 4" with --claim 1--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*